Dec. 9, 1930.   C. H. WILD   1,784,083
CASE FILLING MACHINE
Filed Nov. 8, 1927   10 Sheets-Sheet 3
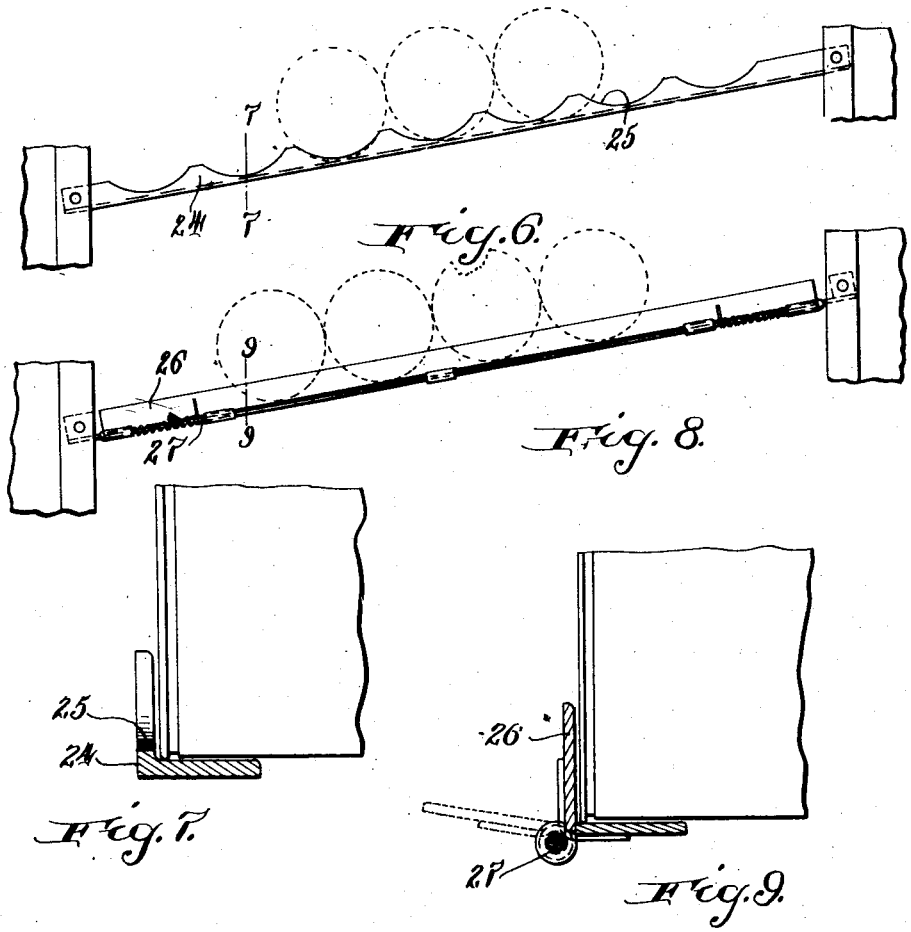
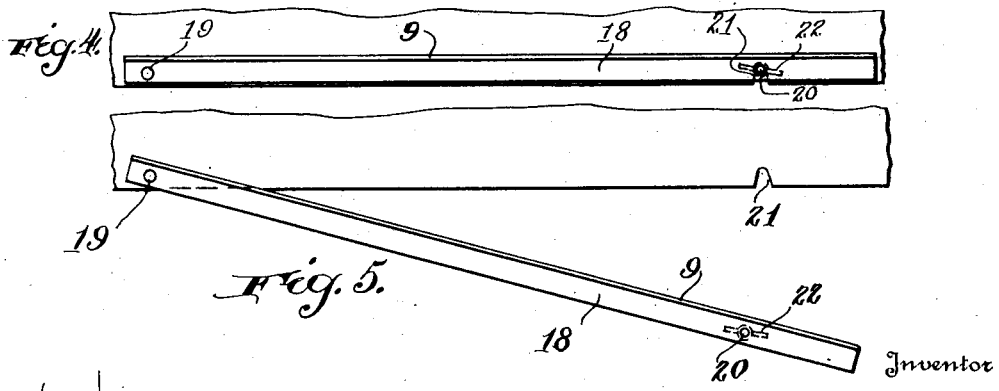

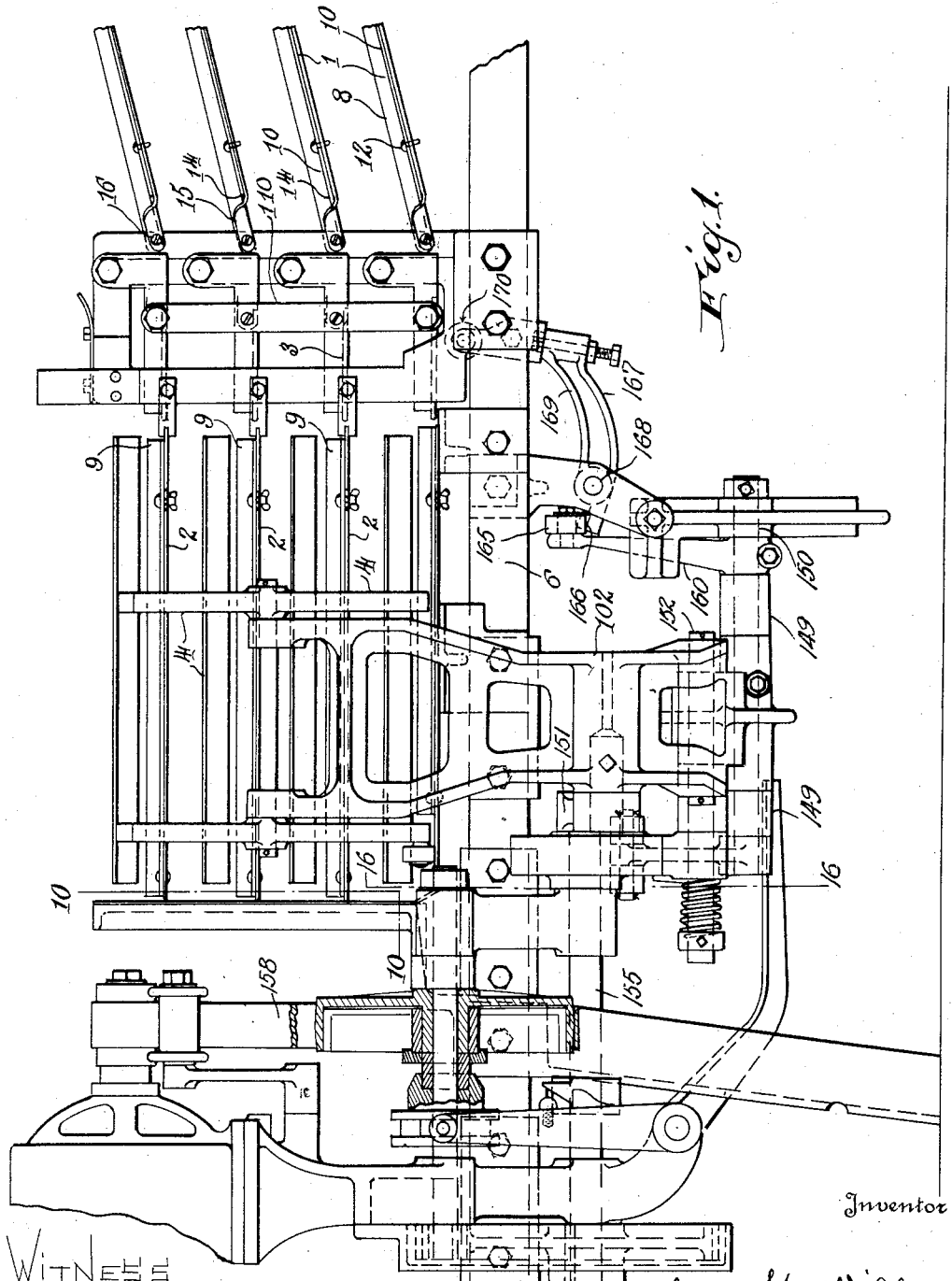

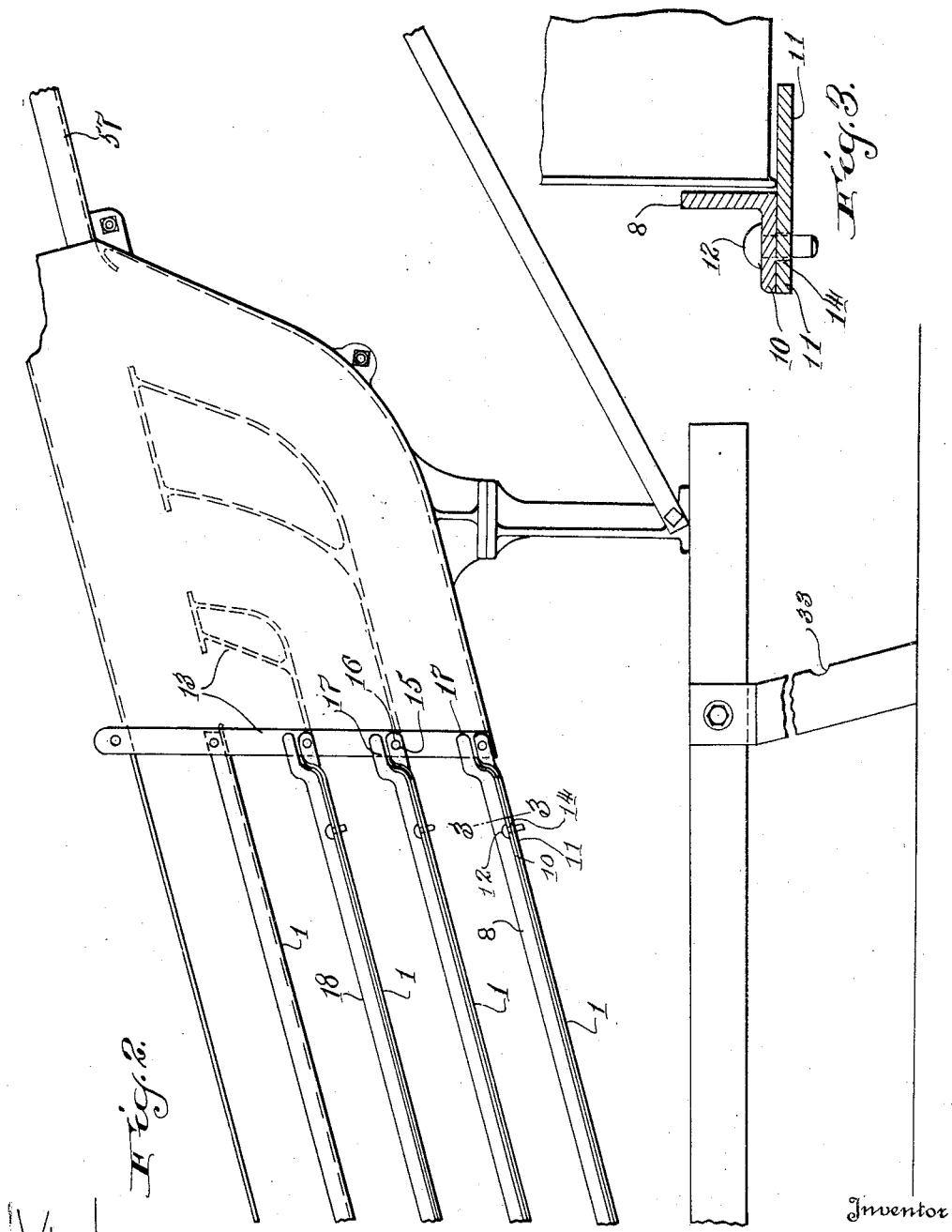

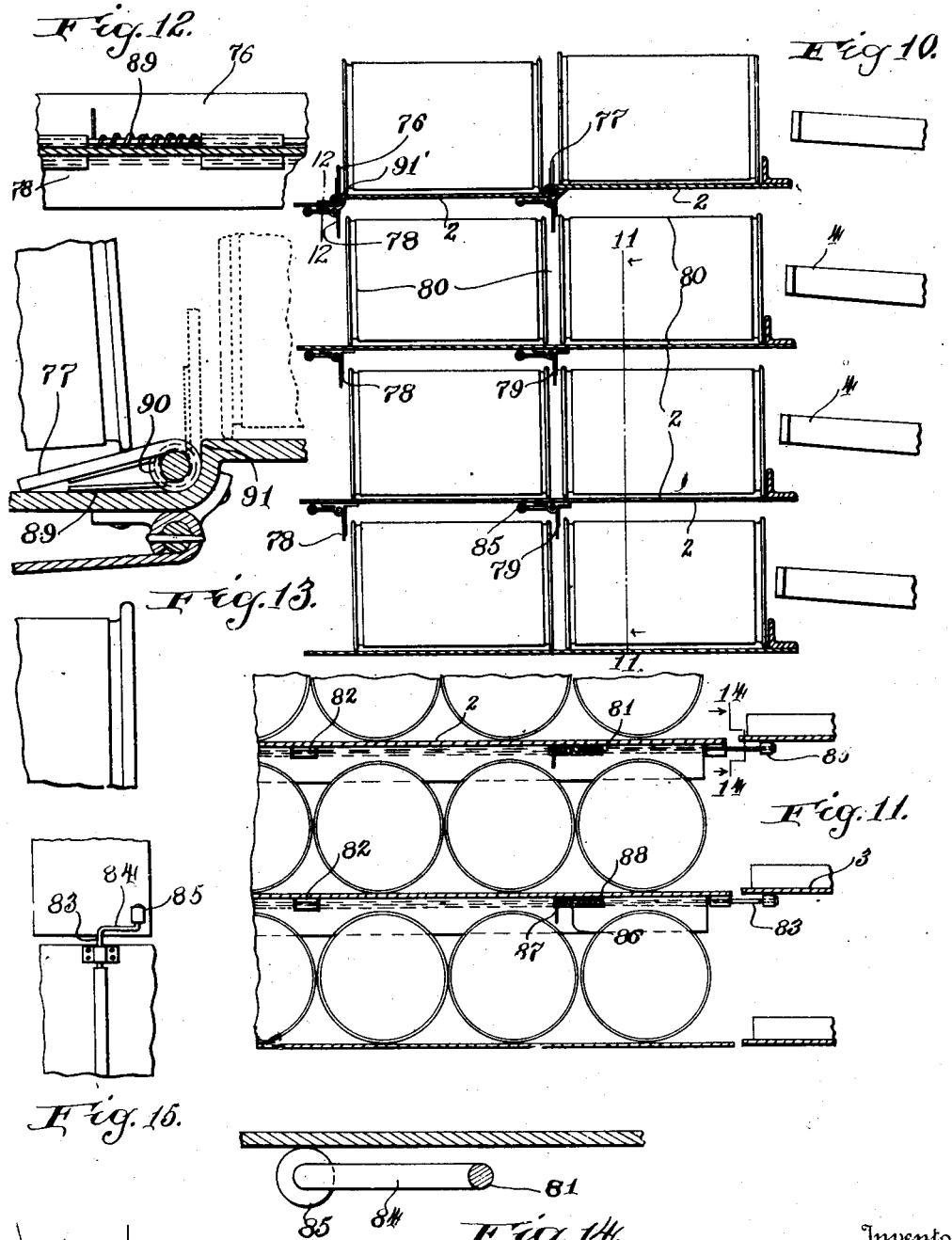

Dec. 9, 1930.  C. H. WILD  1,784,083
CASE FILLING MACHINE
Filed Nov. 8, 1927  10 Sheets-Sheet 5

Dec. 9, 1930.   C. H. WILD   1,784,083
CASE FILLING MACHINE
Filed Nov. 8, 1927   10 Sheets-Sheet 6
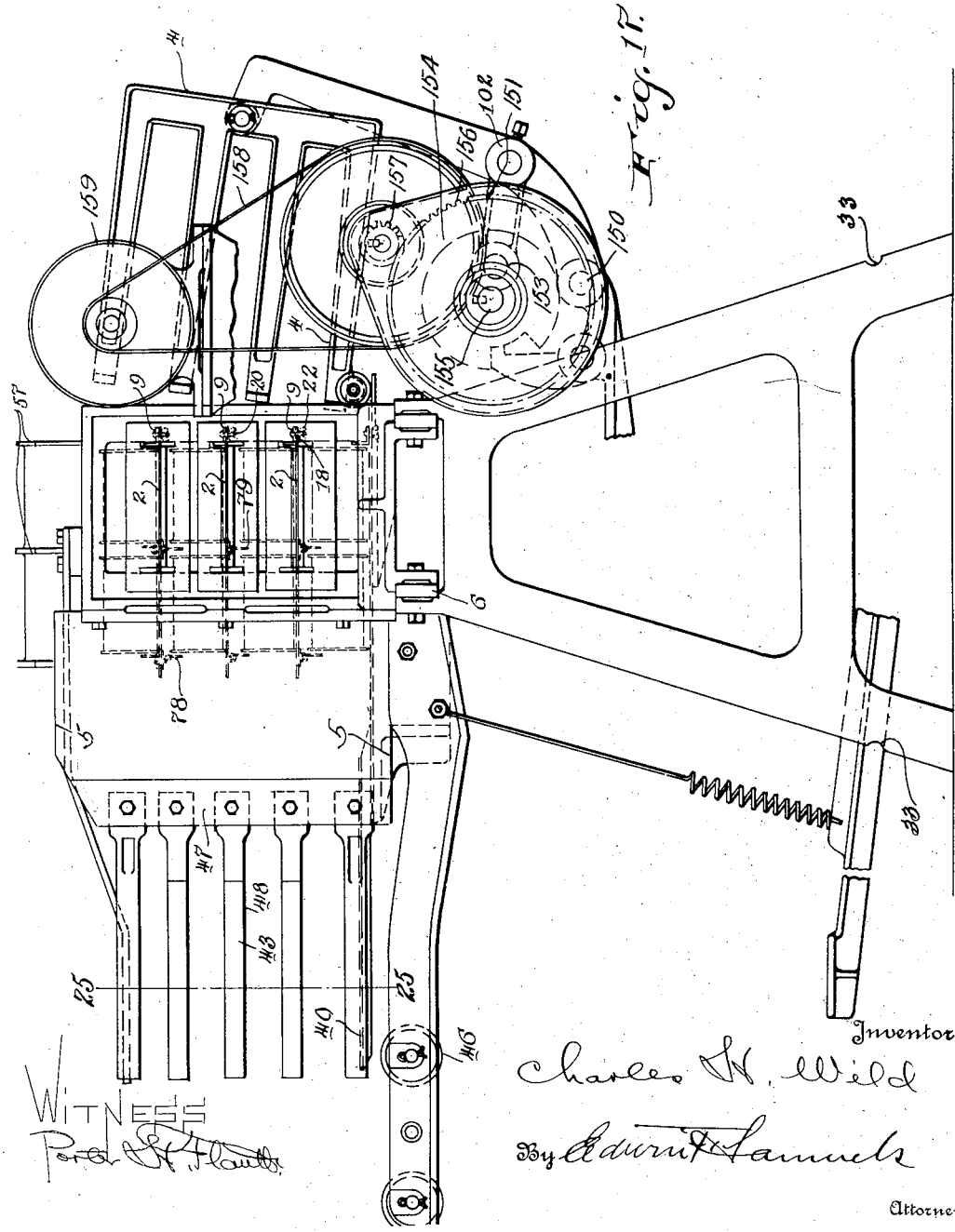

Dec. 9, 1930.  C. H. WILD  1,784,083
CASE FILLING MACHINE
Filed Nov. 8, 1927  10 Sheets-Sheet 7

Inventor
Charles H. Wild
By
Attorney

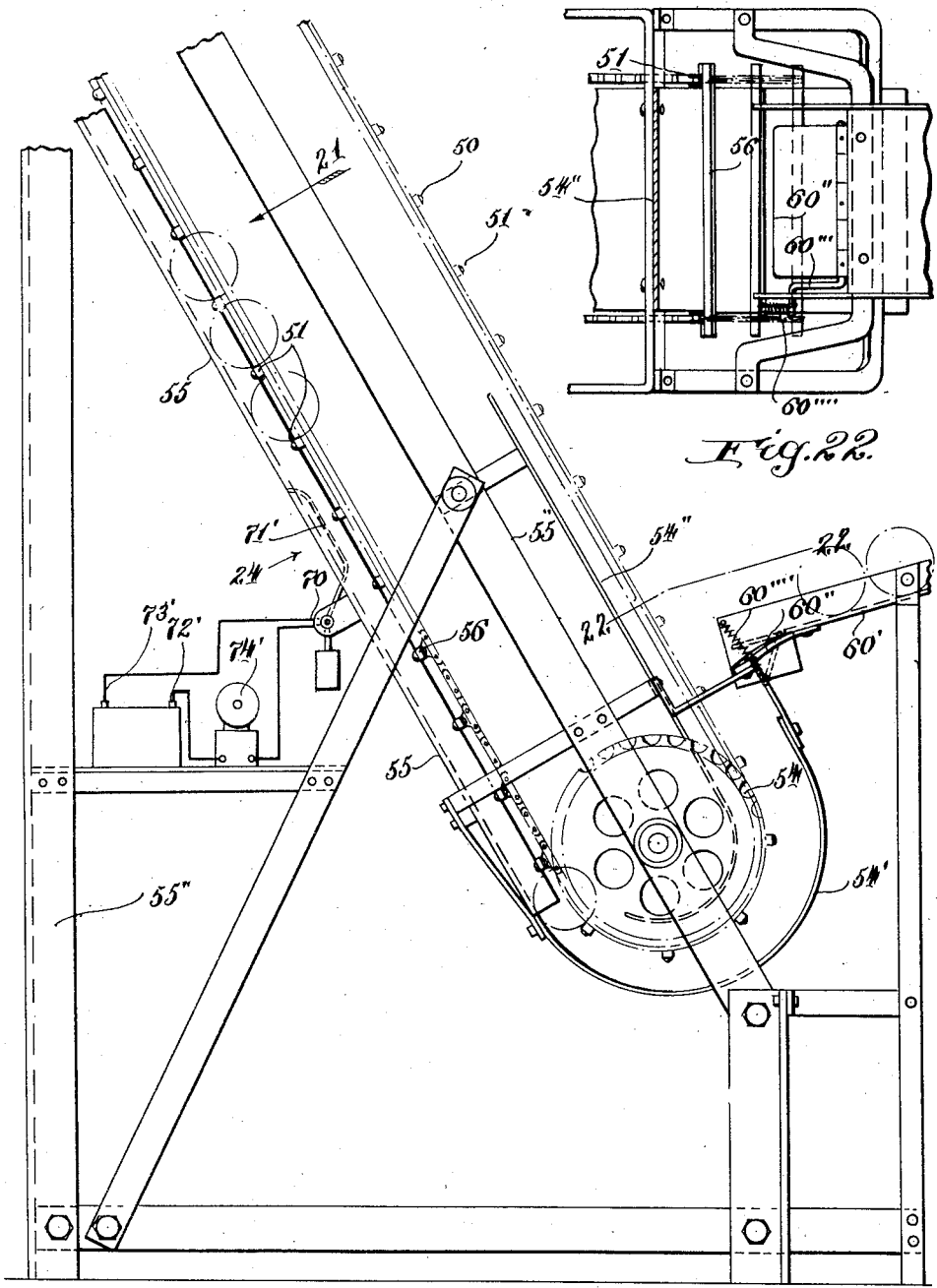

Dec. 9, 1930.  C. H. WILD  1,784,083
CASE FILLING MACHINE
Filed Nov. 8, 1927   10 Sheets-Sheet 9

Patented Dec. 9, 1930

1,784,083

UNITED STATES PATENT OFFICE

CHARLES H. WILD, OF BALTIMORE, MARYLAND, ASSIGNOR TO BURT MACHINE COMPANY, INCORPORATED, OF BALTIMORE, MARYLAND, A CORPORATION OF MARYLAND

CASE-FILLING MACHINE

Application filed November 8, 1927. Serial No. 231,903.

The apparatus of the invention has been developed in connection with a machine for use in the canning art for filling cartons or boxes with cans.

The object of the invention is to improve the efficiency of the machine and increase the facility of its operation and also to overcome certain difficulties encountered in the packing of cans in cartons or cases.

One of the difficulties referred to relates to the removal of the cans which enter the machine without labels or which are not acceptable to the trade for various reasons.

The improvements also relate to the means for supplying to the can filling machine in a plurality of layers, cans received from the labeller or other machine in a single line, and particularly to the distribution of the cans raised above the ways by the elevator, or otherwise, whereby the cans received in a single line are fed to the caser in a plurality of lines or layers corresponding to the number of layers in the load.

Another improvement relates to the provision of means whereby the machine may be adjusted without difficulty to any height convenient to the operator.

Still another subject of invention relates to an improvement in the funnel whereby it is adapted to the feeding of cans particularly of the variety having an exceedingly narrow flange, or no flange at all, so that the cans can only be supported by contact with the cylindrical labelled surfaces. The improvement avoids injury to the labels under these conditions.

Another subject of invention relates to the provision of a supplementary can guide at the side of the shelves or load forming mechanism whereby displacement of the cans or disalignment in their assembled loading position in the path of the plunger is avoided, reducing the tendency to injure the cans and labels and cramp the machine. This supplemental guide is in the path of the loading stroke and is preferably operated in connection with the spacing mechanism, being removed from the path of the cans just prior to the advance of the plunger.

Another subject of invention relates to the provision of means whereby a case may be filled with three or any odd number of layers, the feeding means leading to the load forming mechanism being controlled to vary the load or charge. In the preferred form shown, the mechanism feeds the cans in charges of first two and then one layer alternately.

In the operation of the device as at present employed for filling cartons with three layers of cans, the plunger makes two strokes for each complete filling operation. In this operation the first stroke feeds two layers and the second stroke one layer.

In the accompanying drawings I have illustrated a case filling machine provided with the various features of the invention.

In the drawings:

Figure 1 is a rear side elevation of a case filling machine embodying the features of the invention.

Figure 2 is a side elevation of the can ways and hopper also taken from the rear side wall of the machine, one side of the hopper being removed. This figure shows one form of removable side guides for releasing the defective cans so that they may be removed.

Figure 3 is a fragmentary section on the line 3—3 of Figure 2.

Figure 4 is a fragmentary plan view of one of the can releasing side guides used and located on the load forming shelves showing the side guide in position, a fragment of one shelf being likewise shown.

Figure 5 is a corresponding plan of a fragment of one shelf showing the guide swung outwardly to release one or more of the cans.

Figure 6 is a fragmentary side elevation showing one of the conveyors. This view corresponds to Figure 2 and illustrates a side guide providing for the release or removal of cans from the ways.

Figure 7 is a transverse section of the same on the line 7—7 of Figure 6.

Figure 8 is a side elevation of still another form of side guide providing for the removal of cans from the ways during the case filling operation.

Figure 9 is a section on the line 9—9 of Figure 8.

Figure 10 is a section showing the load forming shelves, looking at the same from the section line 10—10 of Figure 1.

Figure 11 is a fragmentary sectional elevation looking forwardly at the load forming shelves as in Figure 1, the view being taken on and from line 11—11, Figure 10, the cam being in place for the loading stroke of the plunger in both Figures 10 and 11.

Figure 12 is a detail of the spring hinge of the upper supplementary can guide, the same being a section on line 12—12 of Figure 10.

Figure 13 is a section corresponding to Figure 10 and on the same plane on an enlarged scale showing the upper supplementary guide at the center of the shelf in operation, the guide immediately below also being shown.

Figure 14 is a fragmentary section on line 14—14 of Figure 11.

Figure 15 is a bottom plan view showing fragmentarily one separator gate and the supplementary guide shaft for the lower shelves and its arm and follower.

Figure 17 is an elevation looking at the machine from the right, which is the left in the rear view Figure 1. The lower portion of the machine is broken away for convenience.

Figure 19 is a similar view of the lower portion of the same, continuous with Figure 18.

Figure 22 is a section on the line 22—22 of Figure 19, looking in the direction of the arrow.

Figure 16:
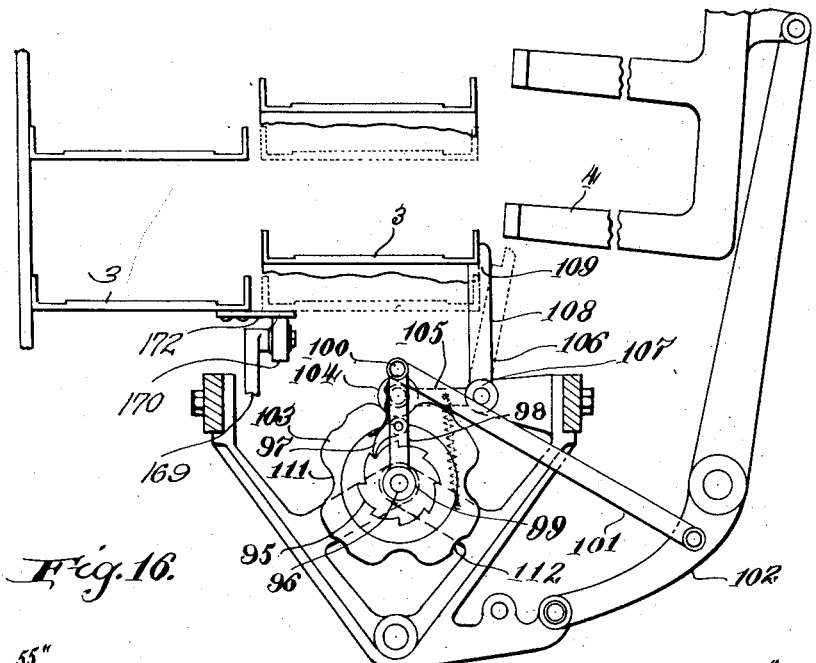
Figure 16 is a section on the line 16—16 of Figure 1 showing the plunger and separator gates, the load forming shelves being omitted to illustrate control mechanisms for feeding two and then one layer of cans alternately.
Figure 21:
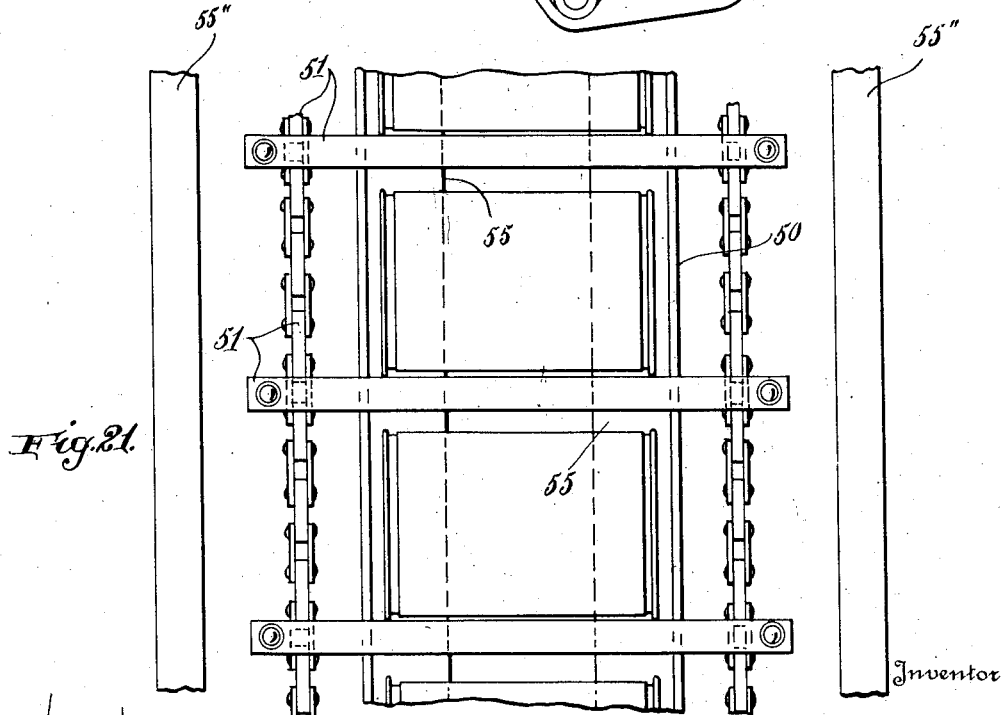
Figure 21 is a fragmentary view of the conveyor at right angles to Figure 19 and looking in the direction of the arrow 21 in Figure 19.
Figure 20:
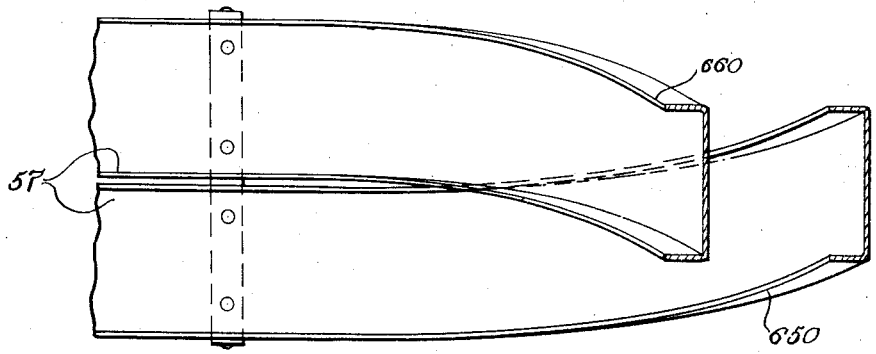
Figure 20 is a section on the line 20—20 of Figure 18.

Referring to the drawings by numerals each of which is used to indicate the same or similar parts in the different figures, the machine, as shown, consists as do the machines of my prior Patents No. 1,443,157 and No. 1,619,839, of inclined feeding ways 1, load forming mechanism or shelves 2 to which the cans are fed from the ways, separating mechanism or gates 3 for cutting off the cans in the load forming mechanism from the cans being fed, a plunger 4 for moving the cans supported on the shelves or load forming mechanism into the cartons and a funnel 5 over which the cartons are placed, which funnel serves to support and guide the loads or charges of cans into the cartons. The machine frame consists of longitudinal base bars 6 supported on legs 7.

In the past it has been customary to place the load forming shelves 2 in the same plane or line with the ways 1. This has resulted in a tendency on the part of the first cans of each load to run away from the remainder of the load so that they are free of restraint and frequently bounce and turn sidewise. This tendency has been overcome in the present instance by placing the shelves at a lesser angle to the horizontal than the ways. In the present instance the ways, as shown, are inclined at 15 degrees to the horizontal and the shelves at about 3 degrees, the incline being downward in the direction of motion of the cans. By this arrangement an added resistance is offered which is first encountered by the first or leading cans, which slow them and cause them to remain in contact with the following cans. This contact overcomes the tendency to turn and bounce and get out of line.

An incident to the can labelling and casing operations which has caused considerable difficulty on the part of the canners and dissatisfaction on the part of the distributors and retailers, is the presence in the cases of unlabelled cans and cans which for other reasons are objectionable and may have been noted but could not be removed without opening the filled cases because casing machines as previously constructed did not provide any way of removing the cans from the machine once they had entered until they had been fed into the cartons.

It will be understood that in all instances the cans on the ways are guided by side rails 8 and the cans on the shelves or in the load forming mechanism are guided as to the rear or plunger side by shelf guides 9, which side guides and shelf guides, except as to the top way and top shelf, prevent the removal of the cans from the machine otherwise than as they are fed by the plunger by way of the funnel into the cartons, so that even when unlabelled cans or cans which were regarded as defective for any reason, were noticed they could not well be removed except by unpacking the filled cartons.

One of the objects of the present invention is to obviate this difficulty and make it possible to remove defective cans or packages from any portion of the machine. To this end the side guide rails 8 of the ways 1, which are provided with a base flange 10 which overlies the outer edge of a longitudinal plate 11 which forms the way proper, are held by means of pins 12 permanently seated therein and projecting downwardly through holes in the edges of the ways 11, the pins being, however, freely removable from the holes which merely serve to position the guide rails.

In the form of the invention shown, the ways proper or strips 11 are secured at one end to the hopper 13 and at the other end to the frame of the machine by means of lugs 15 through which bolts or rivets 16 are passed. The side guides at the hopper ends are turned up at 17 to overlie the lugs 15 and at the other end the flange 10 is cut away at 14. With this arrangement any one of the guide rails 8 can be instantaneously released by raising it to free the bolts 12 and any can which is located on the ways opposite and guided by the said rail then released, can be handled and removed without difficulty.

Having reference now to the shelves 2 or load forming mechanism, see Figures 4 and 5, each of the guides 9 is in the form of an angle bar having a base flange 18. In the past these angle bars have been riveted to the edges of the shelves. In accordance with the present construction, however, the guides are pinned as to the base flange 18 at one end by means of a pin or bolt 19 so that the guide is free to swing, as illustrated in Figure 5, the other end being provided with a bolt 20 which swings into a slot 21 in the edge of the shelf, the same preferably having flaring edges to admit the bolt and the bolt being preferably provided with a wing nut which can be easily turned up by hand against the bottom of the shelf to secure the guide in position, and released. When a defective package or unlabelled can is detected on the shelves or load forming mechanism, it may be conveniently removed by loosening the thumb or wing nut 22 beneath the corresponding guide and swinging the guide outwardly, as shown in Figure 5. If the can is at the right of the shelf, as viewed in Figure 1 or 5, it may be removed forthwith, or if it is at the left end of the shelf the cans at the right must be first removed then the defective can is slid to the right and removed in an obvious manner.

In Figures 6, 7, 8 and 9 I have illustrated other forms of side guides for the ways which provide for the removal of cans during the feeding operation. Figures 6 and 7 show the side guide 24 permanently secured and formed at its upper edge with a series of scallops or arcuate depressions 25 corresponding in size and shape to the size and contour of the cans. These depressions extend almost to the bottom of the guide and any can which it is thought desirable to remove during the casing operation can be located sufficiently near to one of these valleys, scallops or depressions 25 so that it may be aligned therewith, raising it slightly and forcing it slightly backward or forward, and removed without difficulty.

Figures 8 and 9 show a side guide 26 for the ways or shelves which is mounted on a spring hinge 27 and may be turned downward about the hinge by overcoming the tension of the spring, the guide in its depressed position permitting the cans to be freely removed. It is shown in dotted lines in releasing position in Figure 8. When released it springs back into guiding position.

Figure 26:
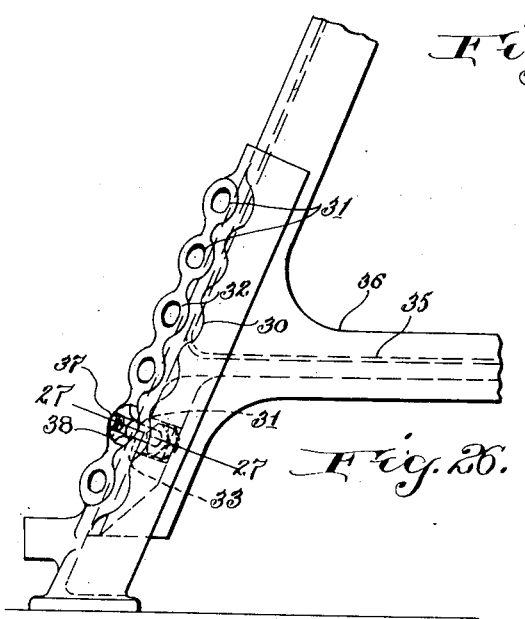
Figure 26 is an elevation of one of the leg extension members.
Figure 27:
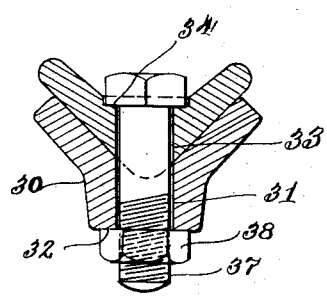
Figure 27 is a section through the leg extension on the line 27—27 of Figure 26.

The invention further contemplates the provision of means whereby the height of the machine may be adjusted to suit the operator. This feature of the invention, see Figures 26 and 27, consists in the provision of leg extension members 30 of angular cross section, said cross section corresponding to the horizontal cross section of the legs 7, which are straight and of angular cross section, so that the extension members may be fitted over the legs in alignment therewith. In order that the extension members may be secured to the legs in adjusted position they are provided with a series of bolt holes 31 arranged in line with the length of the legs and the extension members and preferably at the vertex of the angle of the cross section of the legs and the holes 31 are bossed on the outside of the extension member providing flat surface 32 surrounding each bolt hole 31 on the outside. Each leg 7 is also provided with a hole 33 bisecting the angle of the cross section and spaced up a short distance from the bottom. This hole, as shown, in the cross section, Figure 27, is provided with a seat 34 for a washer or nut or a bolt head on the inside of the leg. The hole 33, as shown, is immediately beneath the web 35 of the cross beam 36 of the frame.

The manner of applying or operating the extension members will be easily understood. When it is desired to increase the height of the machine each leg in turn is raised and the extension member is fitted over the leg. One of the holes 31 in the extension is brought into registration with the single hole 33 in the leg and a bolt 37 is passed through the registering holes and the nut 38 is engaged therewith and tightened thereon. If preferred, the entire machine may be first jacked up to the desired height and the leg extensions fitted thereon at leisure in the manner just described, or otherwise.

Figure 25:
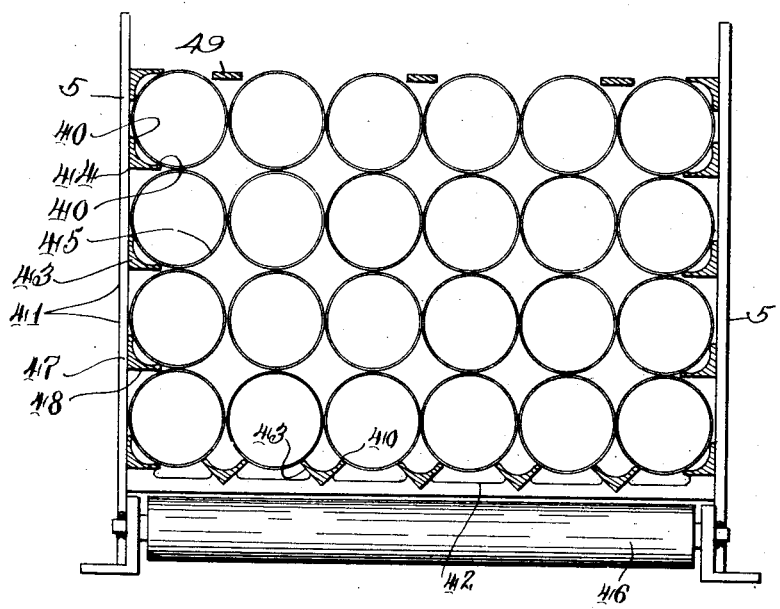
Figure 25 is a section through the funnel on the line 25—25 of Figure 17.

In Figures 17 and 25 I have illustrated an improved feature of the can funnel 5 which directs the loads or charges of cans, as propelled by the plunger, into the cartons or boxes as presented. The object of the improvement is to protect the labels of the cans, particularly as applied to cans which are not provided with any pronounced flange at the edges, as are the so-called "sanitary cans," which flanges serve to prevent contact of the labels with the floor and sides of the funnel and hence protect the labels.

In accordance with the improvement the funnel body, consisting of vertical side walls 41 and bottom 42, is provided with guiding and supporting bars 43 disposed in the direction of motion of the cans entering the cartons, i. e., as propelled by the plunger. These bars are provided with edges 40 which form the points, or more properly, the lines of contact with the cans. These bars 43 are shown in the form of angles arranged to form side supports and bottom supports enclosing and supporting the load. The angle irons are indicated by reference character 43. As shown, the supporting surfaces or edges, which may be sharpened, are formed on angle irons 43 at the outer edges of the same away from the vertex 44, the said supporting and guiding edges 40 being presented to the cans in alignment with their axes and in a position to engage the cylindrical surfaces 45 thereof in a lateral and vertical supporting relation. The angle irons or bars 43 in the preferred form, as shown in Figure 25, are secured to the bottom 42 of the funnel with the vertex 44 of each angle iron turned downwardly, the edges 40 being parallel and in the same horizontal plane, the angle irons being placed to correspond to the size or diameter of the cans being fed. The angles 43 at the sides are secured to the side walls 41 with one web 47 in contact with the side wall and the other web 48 in a horizontal position, one or both of the edges 40 being in contact with the adjacent line of cans, both lines of contact being, as shown, in the lower outside quadrant of the can.

At 46 I have shown a roller beneath the bottom angles 43 for facilitating the insertion of the carton beneath the angles, it being understood that in filling position the carton encloses the bars 43 which are supplemented at the top by top bars 49 extending forwardly from the funnel body.

Figure 18:
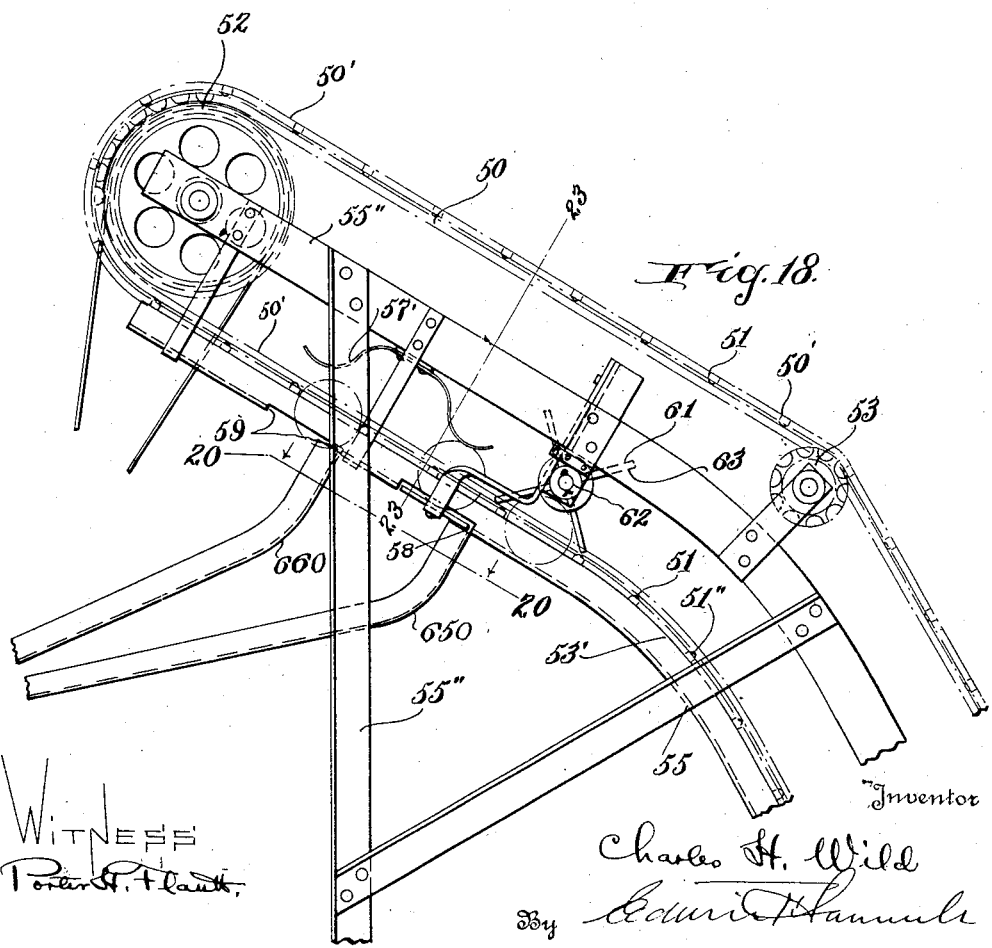
Figure 18 is a rear side view of the top portion of the can elevator which feeds the hopper, showing the two-layer forming mechanism.

The intake end of the machine includes a can feed 50 or conveyor, shown on a large scale in Figures 18 and 19, comprising endless chains 51 driven by a sprocket 52 in any suitable manner, being passed at its lower end about a sprocket 54. This feed chain, as shown, is inclined upwardly and forwardly in the direction of feed as to its lower portion, the chains being deflected above about two idler or guide sprockets 53 and guided below by way 55 whereby it is caused to approach a horizontal direction, the upper portion 50' being inclined forwardly and upwardly at an angle of approximately 30 degrees. The feed or conveyor is enclosed as to the lower half circumference of the sprocket 54 and the portion of the chain lying thereon by a way or can support 55 which is, as to the rectilinear portions composed of angle irons, spaced away from the chain by a little more than one-half the diameter of the cans to be fed. This way extends upwardly and rearwardly parallel to the lower and forward side of the chain. The way 55 and the conveyor are supported on any suitable frame 55''. The iron bars 56 of the conveyor or elevator 50 slide on the top edges of the angle irons forming the can guide and are guided and supported thereby, particularly as to the curve 53' opposite sprocket 53. This conveyor 50 and can support and way 55 feed cans to the casing machine hopper, which is, however, adapted to receive two layers of cans end to end. The portion of the way 55 partially including sprocket 54 and indicated by reference character 54', is formed of a single band of metal. There is also an inside supporting plate 54'' inside the chain extending about the sprocket 54 and upwardly parallel to the chain above the feed chute 60'.

The way or support 55 and conveyor or elevator 50 are of a width to accommodate a single line of cans. Beneath the upper forward portion of the way 55 is a second and double way 57 inclined downwardly to the machine hopper 13 into which it delivers. This way 57 is double, or otherwise of sufficient width to accommodate two rows or layers of cans placed end to end, or otherwise spaced so as to move in two lines to form two layers of cans end to end. The division or distribution of the cans into two lines or layers is accomplished as follows: The way 55, as to the upper portion thereof, is provided with two openings 58 and 59 respectively, the latter being the last in the direction of feed. These openings are each of sufficient dimension to drop the cans which are fed along the way 55. The opening 58 is, however, closed at intervals by a trap door 60 illustrated in detail in Figure 23, which is a section on the line 23—23 of Figure 18.

Figure 23:
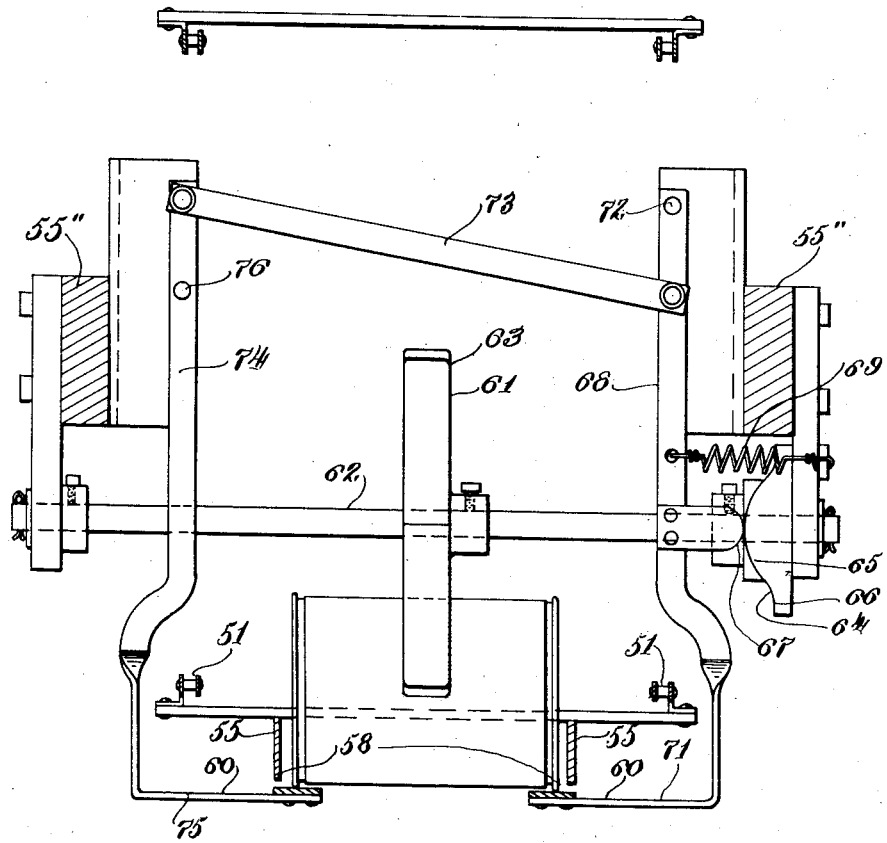
Figure 23 is a section on the line 23—23 of Figure 18 showing the can shutter.

The trap door 60 is actuated by means of a turnstile member 61 mounted on a shaft 62 parallel to the axis of the feed chain sprockets, the arms 63 of the turnstile projecting through the conveyor into the path of the cans, it being understood that the conveyor is formed of a plurality of chains spaced apart between which chains the turnstile arms project. As the machine is at present constructed the turnstile may be operated by the conveyor in the absence of the cans. The turnstile shaft 62 is shown in Figure 23 as carrying secured thereon a cam 64 which may be termed a face cam, as the actuating face 65 is in a plane at right angles to the axis. This actuating face 65 is provided with two depressions 66 spaced apart along the periphery by 180 degrees. The face 65 is engaged by a wiper or follower member 67 adapted to enter the depressions 66. This follower 67 may be carried on a swinging arm 68, the follower being normally pressed against the cam surface by a spring 69 connected to the arm and to the machine frame. This arm 68 carries one member 71 of the trap door 60. The arm 68 is pivotally mounted at its upper end at 72 on the frame and is connected just below the pivot by a connecting rod 73 to the upper end of a swinging arm 74 which carries the other half 75 of the trap door 60. The arm 74 is pivotally mounted at 76 on the frame of the machine below the connecting rod 63 so that the points of connection of the connecting rods 73 being above the pivot of one arm and below the pivot of the other arm, the motion of said connecting rod actuates said arms in opposite directions about their pivots moving the two sections of the trap door simultaneously toward or from each other, the operation being such that as the follower 67 enters the depressions 66 in the cam, the trap door is opened at intervals, occurring twice in each rotation of the turnstile shaft, so as to drop each alternate can through the opening 58 controlled by the trap door, all the cans which pass this opening being dropped through the opening 59 which is spaced further along the way 55.

The cans are thus dropped from the single line carried by the way 55 alternately through the openings 58 and 59. These openings lead respectively to ways or chutes 650 and 660 which, in turn, lead to the opposite sides of the way 57, which is a double way. The operation of the two chutes of the way 57 with the trap door 58 and the opening 59 thus serves to convert the single line of cans on the way 55 to a double line of cans or two layers placed end to end on the way 57. The cans are held in contact with the ways when they reach openings 58 and 59 by means of a curved spring guide 57' which prevents the cans from bouncing over and avoiding the openings.

Figure 24:
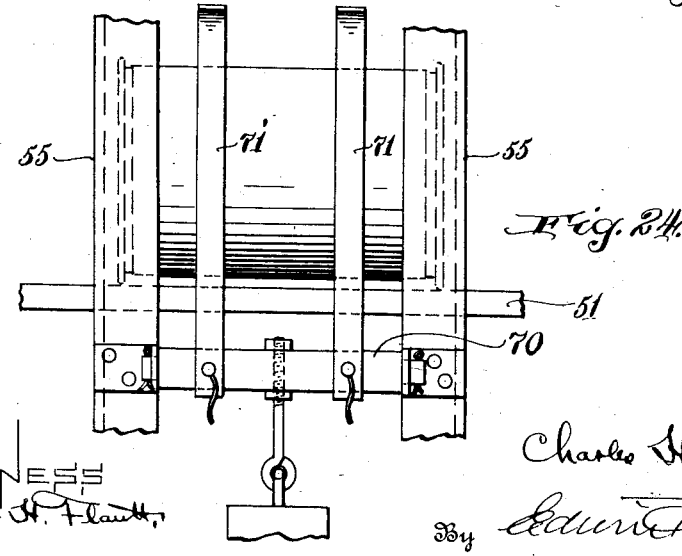
Figure 24 is a fragmentary view looking at the elevator in the direction of the arrow 24 in Figure 19.

The construction illustrated in connection with the can feed, Figures 19 and 24, includes an electric inspector 70 comprising two electric terminals 71' in the path of the cans near the bottom of the way 55. Said terminals are connected to the positive and negative sides 72' and 73' of an electric circuit which also includes a bell 74, so that when and if any unlabelled can passes through the feed, its presence is called to the attention of the operator by the ringing of the bell caused by contact of the metal surface of the can with the terminals 71', thereby completing the electric circuit. The terminals are elongated, as shown, in the direction of feed to extend the period of contact sufficiently to ring the bell.

The conveyor or elevator 50 is fed by a chute 60'. To avoid cramping of the cans between the chute and the conveyor or elevator, the chute is provided at its end next to the elevator with a flexible portion 60'' preferably of sufficient resistive capacity to support a can, but flexible enough to yield to any greater pressure so that if there is any tendency to cramp the flap will yield and release the can, when it will enter the conveyor without further difficulty. As shown, this is a hinged metal plate or flap having a crank 60''' connected to the chute by a spring 60''''. The spring imparts to the flap a tendency to return to supporting position. The crank contacts the side of the way beneath acting as a stop in this position. Any suitable stop may be used.

The difficulties encountered are due to the disalignment and cramping of the cans in front of the plunger, which results in marring of the labels and occasionally in jamming of the mechanism and distortion and destruction of the cans or packages. Particularly in handling empty cans they not infrequently bounce as they land on the shelves and become turned sidewise interfering with the spacing of the cans and the proper formation of the load and also resulting in cramping of the machine and destruction of the cans.

To overcome and avoid the difficulties thus described I have provided, in accordance with the preferred form of the invention, supplementary can guides 76 at the outer or forward side of the upper shelf engaging the outer ends of the cans composing the forward layer of the upper tier, and 77 at the middle of the upper shelf between the ends of the cans, 78 at the outside of the remaining shelves and 79 intermediate of the remaining shelves and between the cans. The guides 78 and 79 are shown in the form of elongated depending plates, each of said plates in guiding position extending downwardly from the bottom of each shelf 2, engaging the end edges of the cans 80 on the next shelf below in guiding relation. The guides 78 and 79 are, in the form of the invention shown, operated simultaneously and in an identical manner. Each said guiding member 78 and 79 is mounted on a shaft 81 which rocks in suitable bearings 82 secured to the bottom side of the shelf 2 above. Each said shaft 81 is provided at its end 83, which is to the rear if the feeding of the cans along the ways 1 be referred to as a forward motion through the machine, particularly at the right and looking at the machine from the plunger side and facing in the direction of the motion of the cans as propelled by the plunger, with a radial arm 84, i. e., an arm which is preferably at right angles to the shaft. This arm which may be referred to as the actuating arm, lies, in the vertical or operative position of the guides 78 and 79, in a horizontal position directly beneath and in contact with each corresponding can separator gate 3, the separator gates being down or open, as shown in Figures 10 and 11, in the operative position of the guides. The necessity for guiding the cans at the forward ends on the loading shelf 2 being mainly present when the cans are passing from the ways 1 into loading position on the shelves, during most of which period the cans forming the load are rolling along the shelves.

Each said arm 84 is preferably provided at its outer end with a roller 85 which engages the gate. To bring the roller under the gate the shaft may be extended beneath the gate. Each of the shafts 81 is also preferably provided with an actuating hinge spring 86, the same being shown in the form of a helical spring wound around the shaft having radially extending ends 87, 88, bearing respectively against the side of the guide 79 and against the bottom of the corresponding shelf 2 imparting to the guide a tendency to return to inoperative position, in which it lies flat against the bottom of the shelf. The respective arms and guides being at right angles, the guides take a vertical position when the gates are down or open.

The supplementary guides 76 and 77, shown at the forward side of the shelves and at the center of the shelves between the cans respectively, operating in connection with the top tier of cans in Figure 10, are, in the form of the invention illustrated, operated in a manner which is different from the operation of the guides 78 and 79. These members are most conveniently operated independently of the separator gates 3. As shown, these supplementary guides 76 and 77 are provided with a hinge spring 89 operating in connection with the hinge 90, by which hinge they are connected to the upper surface of the shelves. The spring 89 which is of the ordinary helical spring wire type generally used for this purpose, maintains the supplementary guides normally in upright position, but when the cans are advanced by the pusher the springs yield to the thrust imparted to the pusher by the cans, the guides being thus folded downwardly against the shelf permitting the cans to pass over them. In order that the hinge members 90 may not obstruct the passage of the cans from the loading shelves to the cartons the upper shelf is stepped at 91 and 91', as illustrated in Figure 13, and each step or shoulder 91 serves as a seat for the corresponding supplementary guide, the vertical surface of the step or shoulder acting as a stop against the spring 89 to position the supplementary guide normally upright or at right angles to the shelf, the advance of the cans in response to the plunger as they move into the carton serving to fold the guides 76 and 77 downwardly to or below the level of the shelf as shown in Figure 13, the weight of the cans being sufficient to overcome the tension of the springs 89, as illustrated.

It will be understood that the guides 78 and 79 at the center and forward edge of each of the lower shelves 2 are normally held in folded position flat against the bottom of each said shelf. The separator gates 3 are raised, i. e., closed during the period when the guides 78 and 79 are thus folded, this being the period of operation of the plunger when the load is pushed into the carton. The folding of the guides removes them from the path of the cans which move endwise, the ends formerly engaged by the guides 76, 77, 78 and 79 being forward. When the plunger has been withdrawn the separator gates 3 are lowered or opened to horizontal position, permitting the cans to enter the load forming enclosure rolling along the shelves where the supplementary guides are needed. The opening of the gates 3 at this time to horizontal position causes them to engage rollers 85 on the arms 84 moving guides 78 and 79 to vertical or guiding position where they remain till the load is formed, being released and permitted to return to folded position when the gates are raised to closed position to cut off the load.

The previous case filling machines in their operation feed the cans to the cartons in charges or loads comprising a single layer or, at the most, comprising two layers, as in the applicant's recent Patent No. 1,619,839.

Cans are now being packed in cartons containing three layers of cans placed one on top of the other end to end. Previously to the introduction of the improvement to be described, such cartons could only be filled by, or in, three strokes of the plunger, feeding one layer of cans at a time.

The object of the feature of the invention now to be disclosed resides in the production of a machine whereby a carton adapted to receive and contain three layers of cans, as described, may be filled in two strokes, one said stroke introducing two layers of cans into the cartons and the other stroke a single layer. In other words, the machine is so constructed that it may be adjusted to feed alternately loads or charges of two layers and loads or charges consisting of a single layer.

The improved construction in the preferred form, as illustrated, comprises means whereby one of the separator gates of a two layer machine is held in closed or raised position at each alternate operation or during a predetermined portion of the operations of the machine whereby the line or layer of cans fed from the ways controlled by the gate, the operation of which is thus varied, is stopped at predetermined intervals, as outlined, causing the machine to feed a correspondingly reduced charge or a charge composed of a single layer of cans. As soon as the gates thus controlled are released the load forming shelves are permitted to become completely filled and a full charge is fed. The machine is thus controlled to feed charges of cans, the number of layers of which is varied, at predetermined intervals, making it possible to fill cartons or cases containing a number of layers which is not an even multiple of the number of layers normally composing the full charge of the machine. In the form illustrated, this operation of varying the feed is accomplished by varying the operation of one set of separator gates holding them at intervals in closed position whereby the feeding of cans from one set of ways forming one layer of cans in the load is prevented so that the machine feeds only the remaining layer or layers while the operation of the portion of the gates referred to is thus varied.

In the machine shown, the mechanism provided for this purpose comprises a ratchet member 95 carried by a shaft 96 mounted in suitable bearings in the frame of the machine. This ratchet is operated and given a step by step rotation by means of a pawl 97 carried by a pawl arm 98 at a point intermediate of the length of the pawl arm, said pawl arm being pivoted at 99 to swing about the shaft 96 and connected at its outer end at 100 by means of a connecting rod 101 to the plunger arm 102 which operates the plunger at each stroke of the machine. The ratchet shaft 96 carries a cam 103 which is engaged by a follower 104 carried by one arm 105 of a bell crank lever 106 mounted to oscillate about a stationary bearing 107 at the junction of the arms, said bell crank lever having an upright arm 108 substantially at right angles to the arm 105, which arm 108, in the form of the invention shown, is notched at its upper end at 109, or otherwise formed, to engage and support in its innermost position one of the separator gates 3, the gates of each series being connected by an upright connecting rod 110, Figure 1, to operate together.

This action serves to close all of the gates on one side or controlling one layer of cans, or rather to hold them in closed position. The cam 103 is provided with a plurality of depressed portions or seats 111 into which the follower 104 may enter at intervals, in which position of the follower the end 109 of the upright 108 of the bell crank lever engages one of the gates 3 and supports the entire series of gates on one side of the machine. In the form of the invention shown, the depressed portions 111 are four in number and the ratchet 95 has eight teeth, one said seat corresponding to each alternate tooth and the alternate teeth corresponding to the depressed portions, being so located that each alternate dwell of the ratchet occurs when the follower 104 occupies the corresponding depression 111 and this dwell further occurs or begins when the gates 3 are raised in the operation of the machine whereby the entrance of the upright member or arm 108 of the bell crank lever 106 beneath the gate is made possible, so that the gates of one set may be held in raised position cutting off the supply of cans interrupting the supply of cans from this side of the machine.

The surface of the cam between the depressions may be circular or be slightly hollowed out as at 112 to receive the roller and position the parts between the strokes of the pawl.

By supporting one set of the separator gates 3 in closed position at times corresponding to the alternate feeding operations of the cans to the load forming shelves, the load forming operation is so controlled as to cause the machine to feed loads composed of two layers and loads composed of one layer alternately.

The operation of the various improved features and details has been fully described in the preamble and in connection with the description of the structure, as has also the principle of operation of the machine, the same also being fully discussed in applicant's prior Patent No. 1,619,839.

In accordance with the drawings in this application and the disclosure of the prior patent, the plunger 4 is carried by an arm 102 which is pivotally mounted on a shaft 150 rotating in suitable bearings 149 secured to the frame and is actuated by way of a connecting rod 151 pivotally connected at one end to the plunger arm at 152 and at the other end to the crank pin 153 carried by a rotary member 154, secured to the shaft 155 operated by gear connections 156, 157 and belt 158 from the motor 159. The plunger is thus advanced at regular intervals, forwarding at each stroke a load of cans from the shelves through the funnel into a case or carton placed on the rollers 46, Figure 17, to receive the cans or packages.

In order to actuate the gates 3, the arm 102 is rigidly connected to the shaft 150, which carries secured thereto a cam roller arm 160 carrying a roller 165 which engages at suitable intervals, corresponding to the motion of the plunger, a dog 166 on the end of a lever 167 pivoted at 168 on the frame and having opposite to the dog 166 a relatively long arm 169 carrying a roller 170 which engages beneath the lower gate 3, thereby opening all of the gates at each stroke of the plunger and just in advance of the engagement of the plunger with the cans. Figure 16 shows the roller 170 in engagement with the bottom gate 3 on one side, the said gate being provided with an extension 172 beneath the right hand bottom gate 3 whereby both tiers of gates may be opened simultaneously. The various motions thus described are part of the prior art to which the improvements to be claimed are supplementary.

I have thus described specifically and in detail a machine embodying the improvements which are the subject of my invention in the preferred and various alternative forms in order that the nature of the same and the manner of constructing and applying them may be clearly understood, however, the specific terms herein are used descriptively rather than in a limiting sense, the scope of the invention being defined in the claims.

What I claim as new and desire to secure by Letters Patent is:

1. In a machine for filling cartons with cans, load forming shelves, a plurality of ways arranged side by side to feed cans to the load forming shelves in a plurality of layers, means for moving the load from the shelves into the cartons and means for preventing the passage of cans to the shelves from the ways feeding a portion of the layers while the cans are being fed into the load forming shelves from the remainder of the ways, whereby the number of layers in the load is varied at predetermined intervals.

2. In a machine for filling cartons with cans, a load forming enclosure adapted to receive and enclose a plurality of layers of cans, ways arranged side by side to feed a plurality of layers of cans to said enclosure, separator gates adjacent the enclosure for separating the cans on the ways from the cans in the enclosure, a pusher operating transversely to the ways for moving the load in the enclosure transferring the same to the cartons, and means for holding part of said gates at intervals in closed position closing the ways corresponding to part of the layers while the cans are being fed to the remainder of the load forming mechanism, whereby the number of layers in part of the load is reduced varying the number of layers in the load at predetermined intervals.

3. In a machine for filling cartons with cans, a load forming enclosure adapted to receive and enclose a plurality of layers of cans, ways arranged side by side to feed a plurality of layers of cans to the load forming enclosure, separator gates in the ways adjacent the enclosure for separating the cans on the ways from the cans in the enclosure, a pusher for moving the load in the enclosure transferring the same to the cartons, a cam, means connected to the pusher for imparting to the cam a step by step rotation, the steps corresponding to the strokes of the pusher, means for supporting part of said gates in closed position, a follower for the cam actuating said closing means, the cam surface having at intervals, corresponding to a fixed proportion of the said steps, a variation of contour providing for the movement of said supporting member to supporting position.

4. In a machine for filling cartons with cans, a load forming enclosure adapted to receive and enclose a plurality of layers of cans, ways arranged side by side to feed a plurality of layers of cans to said enclosure leading to the load forming enclosure, separator gates on the ways adjacent the enclosure for separating the cans on the ways from the cans in the enclosure, a pusher for moving the load in the enclosure transferring the same to the cartons, and means for holding part of said gates at intervals in closed position closing the ways corresponding to part of the layers while the cans are being fed to the remainder of the load forming mechanism, said means comprising a lock for the gates holding the same in closed position and means connected to the pusher having a step by step motion imparted thereto by the pusher for actuating said locking means at intervals corresponding to a fixed proportion of the pusher strokes.

5. In a machine for filling cartons with cans, a load forming enclosure adapted to receive and enclose a plurality of layers of cans, ways arranged side by side to feed a plurality of layers of cans to said enclosure leading to the load forming enclosure, separator gates on the ways adjacent the enclosure for separating the cans on the ways from the cans in the enclosure, a pusher for moving the load in the enclosure transferring the same to the cartons, means for closing the separator gates prior to the stroke of the said pusher, and means for holding part of said gates at intervals in closed position closing the ways corresponding to part of the layers while the cans are being fed to the remainder of the load forming mechanism, said means comprising a locking lever for locking a portion of the separator gates in closed position, a cam having a follower connected to the locking lever and a pawl connected to the pusher to impart to the cam a step by step rotation corresponding to the stroke of the pusher.

6. In a casing machine for cans, a load forming enclosure, ways for leading the cans to the load forming enclosure and a pusher for transferring the cans from the enclosure to the cartons, the ways having side guides and releasable means cooperating therewith to release the cans providing for the removal of the cans laterally from the ways.

7. In a machine for filling cases with cans, a load forming enclosure, inclined ways leading downwardly to the enclosure, the ways having side guides, the guides on one side being hinged and having spring means and a stop tending to hold them in vertical position, the said construction providing for rotating of the guides downwardly to horizontal position against the tension of the spring, releasing the cans so they can be removed from the ways in a lateral direction.

8. In a machine for filling cartons with cylindrical packages, a load forming enclosure having shelves for supporting the packages, a pusher for moving the packages into the carton, ways for leading the packages to the enclosure, the shelves being provided with side guides extending along the shelves in the direction of the ways and means for securing the guides in position providing for the release of the packages in a lateral direction, said means comprising a flange at the base of the guide overlying the edge of the shelves, a bolt extending through the flanges and through the shelf at one end holding the guide in position so that it may be swung about the bolt, a bolt extending through the flange and through the edge of the shelf at the other end, the shelf being notched providing for the convenient release of the shelf permitting it to be swung about the bolt at the other end.

9. In a machine for filling cartons with cylindrical packages, a load forming enclosure having shelves to support the packages in a plurality of tiers, ways leading to the shelves, a pusher operating transversely to the ways to move the packages from the load forming shelves into the cartons, supplementary guides at the edges of the shelves and in substantial alignment with the ways, said guides engaging the ends of the cans which are forward in the motion of the load as propelled by the plunger into the cartons, said guides being movably mounted to provide for the release of the packages permitting them to move from the shelves into the cartons.

10. In a machine for filling cartons with cylindrical packages, a load forming enclosure having shelves to support the packages in a plurality of tiers, ways leading to the shelves, a pusher operating at right angles to the ways to move the packages from the load forming shelves into the cartons, supplementary guides at the edges of the shelves which are forward in the final motion of the packages and in substantial alignment with the ways engaging the ends of the cans, a hinge supporting each of said guides on the shelf, a stop for locating the guides in vertical position, a spring tending to maintain the guides in vertical position.

11. In a machine for filling cartons with cylindrical packages, a load forming enclosure having shelves to support the packages in a plurality of tiers, ways leading to the shelves, a pusher operating at right angles to the ways to move the packages from the load forming shelves into the cartons, supplementary guides at the edges of the shelves and in substantial alignment with the ways, said guides being at the edges of the shelves which are forward in the direction of motion of the load as propelled by the plunger into the cartons, a hinge for each guide whereby it is mounted on the shelf, the adjacent portions of the shelf being above the hinge, and a spring yielding to the thrust and weight of the packages and tending to swing the guide to upright position.

12. In a machine for filling cartons with cylindrical packages, load forming shelves, inclined ways leading downwardly to the shelves, a pusher for moving the packages from the load forming shelves into the cartons, guides adjacent the shelves aligned with the ways engaging the ends of the packages which are forward in the motion of the packages as moved by the plunger into the cartons, each of said guides having a hinged support, separator gates at the ends of the ways separating the packages on the ways from the packages forming the load, the guides having means projecting into the path of a gate, the guides being actuated thereby to swing the guides into guiding position as the gate moves to open position.

13. In a machine for filling cartons with cylindrical packages, load forming shelves, inclined ways leading downwardly to the shelves, a pusher reciprocated at right angles to the ways moving the packages from the load forming shelves into the cartons, guides adjacent the shelves aligned with the ways engaging the ends of the packages which are forward in the motion of the packages as moved by the plunger into the cartons, said guides being arranged beneath the shelves and extending downwardly into contact with the packages on the next lower shelf, each of said guides having a hinged support, separator gates at the ends of the ways separating the packages on the ways from the packages forming the load, the guides having levers projecting into the paths of the corresponding gates and actuated thereby to swing each guide into guiding position to guide the packages as the gate moves to open position and springs tending to move the guides into inoperative position as the corresponding gate is closed.

14. In a machine for filling cartons with cylindrical packages, load forming shelves, inclined ways leading downwardly to the shelves, a pusher operating at right angles to the ways for moving the packages from the load forming shelves into the cartons, guides adjacent the shelves aligned with the ways engaging the ends of the packages which are forward in the motion of the packages as moved by the plunger into the cartons, each of said guides having a hinged support, separator gates at the ends of the ways separating the packages on the ways from the packages forming the load, the guides having means projecting into the path of the corresponding gate and actuated thereby to swing each guide out of the path of the packages as the gate moves to open position.

15. In a machine for filling cartons with cylindrical packages, a load forming enclosure for a plurality of layers of said packages, ways forming a plurality of paths side by side for said packages leading to said enclosure to deliver the packages to said enclosure in a plurality of layers and means for feeding the packages to said ways and forming them in a plurality of lines to supply them to the said plurality of layers comprising a conveyor, means for operating the conveyor, ways along which the packages roll in a single line propelled by the conveyor, a plurality of openings for the packages in the path of the packages leading downwardly from said conveyor ways, one corresponding to each layer, a chute leading from each said opening to the machine ways, the first of said openings on the conveyor way in the direction of the motion of the packages thereon having closing means and means for operating said closing means to close the said first opening to the passage of part of the packages, bridging the said opening and carrying said part of the packages across the opening and delivering them to the second said opening, the remainder of the packages being released through the first opening, whereby part of the packages are delivered to one chute through one opening and the alternate packages are delivered to the other chute through the other openings forming two lines of packages side by side to be delivered to the machine, forming two layers.

16. In a machine for filling cartons with cylindrical packages, a load forming enclosure for a plurality of layers of said packages, ways forming a plurality of paths side by side for said packages leading to said enclosure to deliver the packages to said enclosure in a plurality of layers and means for feeding the packages to said ways and forming them in a plurality of lines to supply them to the said plurality of layers comprising a conveyor in the form of an endless belt, means for operating the conveyor belt, ways along which the packages roll propelled by the conveyor, a plurality of openings for the packages leading from said conveyor ways, one corresponding to each layer, a chute leading from each said opening to the machine ways, the first of said openings on the conveyor way in the direction of the motion of the packages thereon having closing means and means for operating said closing means to close the said first opening to the passage of each alternate package, bridging the said opening and carrying each alternate package across the opening and delivering it through the second said opening whereby part of the packages are delivered to one chute through one opening and the alternate packages are delivered to the other chute through the other openings forming two lines of packages side by side to be delivered to the machine, forming two layers, the closing means for said opening comprising a shaft rotated step by step in correspondence with the motion of the packages, a cam connected to said shaft to rotate therewith, a swinging arm, a follower therefor engaging the cam, said arm being pivotally mounted on the frame and carrying at one end a closing member forming one element of said closing means, a second closing member, a swinging arm carrying the same and pivotally mounted on the opposite side of the conveyor way, a connecting rod connecting the two swinging arms and opposite sides of their respective pivots, whereby they are moved simultaneously in opposite directions in closing and opening the aperture in the way.

17. In a machine for filling cartons with cylindrical packages, a load forming enclosure for a plurality of layers of said packages, ways forming a plurality of paths side by side for said packages leading to said enclosure to deliver the packages to said enclosure in a plurality of layers and means for feeding the packages to said ways and forming them in a plurality of lines to supply them to the said plurality of layers comprising a conveyor in the form of an endless belt, means for operating the conveyor belt, ways along which the packages roll propelled by the conveyor, a plurality of openings for the packages leading from said conveyor ways, one corresponding to each layer, a chute leading from each said opening to the machine ways, the first of said openings on the conveyor way in the direction of the motion of the packages thereon having closing means and means for operating said closing means to close the said first opening to the passage of each alternate package, bridging the said opening and carrying each alternate package across the opening and delivering it through the second said opening whereby part of the packages are delivered to one chute through one opening and the alternate packages are delivered to the other chute through the other openings forming two lines of packages side by side to be delivered to the machine, forming two layers, the closing means for said opening comprising a shaft rotated step by step in correspondence with the motion of the packages, two doors for said opening and means operated by said shaft whereby they are moved simultaneously in opposite directions in closing and opening the aperture in the way.

18. A machine for filling cartons with cylindrical packages comprising a load forming enclosure, ways leading the packages to the enclosure, a pusher operating at an angle to the ways to move the packages in the enclosure endwise into the cartons, and a funnel for guiding the packages from the enclosure into the cartons comprising angle irons forming the bottoms and sides of the funnel, the angle irons being arranged with the free edges of their webs remote from the vertex turned inwardly and forming supporting edges for the packages serving as the sole support for the package, the said edges being arranged in the line of the motion of the packages into the cartons.

19. In a machine for filling cartons with cylindrical packages, a funnel for leading the packages endwise into the cartons, the same comprising a frame and strips of material extending in the direction of motion of the packages into the cartons, said strips being arranged with their edges disposed toward the packages for contact therewith and acting as the sole support for the load engaging the same at the sides and bottom.

20. In a casing machine for cans, a load forming enclosure, ways for leading the cans to the load forming enclosure and a pusher for transferring the cans from the enclosure to the cartons, the ways having side guides adapted to guide the cans in the direction of the ways and to release the cans, providing for the removal of the cans laterally from the ways.

Signed by me at Baltimore, Maryland, this 9th day of August, 1927.

CHARLES H. WILD.